US012732305B2

(12) United States Patent
Mao

(10) Patent No.: US 12,732,305 B2
(45) Date of Patent: Sep. 8, 2026

(54) MULTI-CHANNEL DATA TRANSMISSION METHOD AND RECEIVING METHOD, TRANSMISSION END, AND RECEIVING END

(71) Applicant: TENCENT TECHNOLOGY (SHENZHEN) COMPANY LIMITED, Shenzhen (CN)

(72) Inventor: Junling Mao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 6 days.

(21) Appl. No.: 18/886,593

(22) Filed: Sep. 16, 2024

(65) Prior Publication Data

US 2025/0015925 A1 Jan. 9, 2025

Related U.S. Application Data

(63) Continuation of application No. PCT/CN2023/123918, filed on Oct. 11, 2023.

(30) Foreign Application Priority Data

Nov. 7, 2022 (CN) ......................... 202211387320.8

(51) Int. Cl.
*H04L 1/00* (2006.01)
*H04L 43/0829* (2022.01)

(52) U.S. Cl.
CPC .......... *H04L 1/0068* (2013.01); *H04L 1/0002* (2013.01); *H04L 1/0041* (2013.01); *H04L 43/0829* (2013.01)

(58) Field of Classification Search
None
See application file for complete search history.

(56) References Cited

U.S. PATENT DOCUMENTS 5,282,209 A * 1/1994 Bonnerot .................. H04L 1/04 714/821
6,747,998 B1 6/2004 Enari
(Continued)

FOREIGN PATENT DOCUMENTS

CN 1237294 A 12/1999
CN 108513701 A 9/2018
JP 2015001960 A 1/2015

OTHER PUBLICATIONS

The World Intellectual Property Organization (WIPO) International Search Report for PCT/CN2023/123918 Dec. 19, 2023 5 Pages (including translation).

(Continued)

*Primary Examiner* — Guerrier Merant
(74) *Attorney, Agent, or Firm* — Anova Law Group, PLLC

(57) ABSTRACT

A multi-channel data transmission method includes dividing a plurality of data packets including at least one input data packet into a plurality of groups including a target group that includes the at least one input data packet, determining a target channel pair, for the target group, including a primary transmission channel and an auxiliary transmission channel that are established based on different networks, performing error correction encoding on the at least one input data packet to obtain at least one output data packet and at least one error correction packet, and transmitting the at least one output data packet and the at least one error correction packet using the primary transmission channel and the auxiliary transmission channel, respectively.

17 Claims, 6 Drawing Sheets

(56) References Cited

U.S. PATENT DOCUMENTS

| | | | | |
|---|---|---|---|---|
| 6,775,257 | B1 | 8/2004 | Watanabe | |
| 8,787,153 | B2 * | 7/2014 | Begen | H04L 1/0018 370/228 |
| 2020/0092043 | A1 | 3/2020 | Xue et al. | |
| 2022/0255660 | A1 | 8/2022 | Yu et al. | |

OTHER PUBLICATIONS

The European Patent Office (EPO) The Extended European Search Report for Application No. 23887712.0 Mar. 30, 2026 17 Pages.
Zongzheng Wang et al. "An Efficient Network Coding Scheme for Heterogeneous Wireless Networks," Globecom 2020-2020 IEEE Global Communications Conference. IEEE, 2020.
Changqiao Xu et al. "Pipeline network coding-based multipath data transfer in heterogeneous wireless networks." IEEE Transactions on Broadcasting 63.2 (2016): 376-390.

* cited by examiner

MULTI-CHANNEL DATA TRANSMISSION METHOD AND RECEIVING METHOD, TRANSMISSION END, AND RECEIVING END

CROSS-REFERENCE TO RELATED APPLICATIONS

This application is a continuation of International Application No. PCT/CN2023/123918, filed on Oct. 11, 2023, which claims priority to Chinese Patent Application No. 202211387320.8, filed with the China National Intellectual Property Administration on Nov. 7, 2022 and entitled "MULTI-CHANNEL TRANSMISSION METHOD, MULTI-CHANNEL RECEIVING METHOD, TRANSMISSION END, AND RECEIVING END," the entire contents of both of which are incorporated herein by reference.

FIELD OF THE TECHNOLOGY

Embodiments of this application relate to the technical field of multi-channel transceiving in the field of data packet transceiving, and in particular, to a multi-channel data transmission method and receiving method, a transmission end, and a receiving end.

BACKGROUND OF THE DISCLOSURE

Generally, network devices such as a robot, a logistics vehicle, and a passenger vehicle may enter a coverage hole of a single network during movement. In this case, data transmission may be performed through a plurality of transmission channels, to improve reliability of data transmission. In addition, in a real-time remote controlled video transmission scenario, data transmission may also be performed through a plurality of transmission channels.

The data transmission through a plurality of transmission channels includes a dual transmission mode and an aggregation mode. In the dual transmission mode, a transmission end replicates a to-be-transmitted data packet, and respectively transmits the two to-be-transmitted data packets in two transmission channels. When the data packet transmitted in one of the two transmission channels is lost, a receiving end may receive the correct data packet in the other of the two transmission channels. In the aggregation mode, the transmission end may allocate the to-be-transmitted data packet to a plurality of different transmission channels for transmission based on an allocation algorithm, and the receiving end aggregates the data packets received on the transmission channels to obtain a final data packet.

In the dual transmission mode, the same data packet needs to be transmitted twice, which consumes large data traffic for transmission. In addition, when a rate of the to-be-transmitted data packet exceeds a bandwidth of a single channel, a packet loss may occur. In the aggregation mode, the aggregation process results in an increase in a transmission delay. Therefore, the aggregation mode is inapplicable to scenarios requiring a low delay. In addition, allocating the data packet for transmission results in a degraded packet loss prevention capability of the data packet.

SUMMARY

In accordance with the disclosure, there is provided a multi-channel data transmission method including dividing a plurality of data packets including at least one input data packet into a plurality of groups including a target group that includes the at least one input data packet, determining a target channel pair, for the target group, including a primary transmission channel and an auxiliary transmission channel that are established based on different networks, performing error correction encoding on the at least one input data packet to obtain at least one output data packet and at least one error correction packet, and transmitting the at least one output data packet and the at least one error correction packet using the primary transmission channel and the auxiliary transmission channel, respectively.

Also in accordance with the disclosure, there is provided a multi-channel data receiving method including receiving at least one output data packet and at least one error correction packet using a primary transmission channel and an auxiliary transmission channel, respectively, of a target channel pair that are established based on different networks, and performing error correction decoding on the at least one output data packet based on the at least one error correction packet to obtain a decoded data packet.

Also in accordance with the disclosure, there is provided an electronic device including at least one processor and at least one computer-readable storage medium storing at least one computer program that, when executed by the at least one processor, causes the electronic device to divide a plurality of data packets including at least one input data packet into a plurality of groups including a target group that includes the at least one input data packet, determine a target channel pair, for the target group, including a primary transmission channel and an auxiliary transmission channel that are established based on different networks, perform error correction encoding on the at least one input data packet to obtain at least one output data packet and at least one error correction packet, and transmit the at least one output data packet and the at least one error correction packet using the primary transmission channel and the auxiliary transmission channel, respectively.

DESCRIPTION OF EMBODIMENTS

Solutions provided in this application may involve a cloud technology.

For example, the solutions provided in this application are applicable to the Internet of Things (IoT). The IoT refers to collecting in real time, through various devices and technologies such as various information sensors, radio frequency identification technologies, global positioning systems, infrared sensors, and laser scanners, various necessary information such as sound, light, heat, electricity, mechanics information, chemical information, biological information, and positions of any object or process that needs to be detected, connected, or interacted with, to achieve ubiquitous connection between objects and between objects and people through various possible network access, thereby achieving intelligent sensing, identification, and management of the object and the process. The IoT is an information carrier based on the Internet, the conventional telecommunication network, and the like, which enables all common physical objects that can be independently addressed to form a connected network.

The cloud IoT is intended to connect information sensed and instructions received by a sensor device in the conventional IoT to the Internet to realize real networking, and realize massive data storage and computing through a cloud computing technology. The IoT is intended to connect objects to each other to sense a current operating state of each "object" in real time, during which a large amount of data information is generated. Therefore, how to aggregate the information and how to screen out useful information from the massive information to support decision making in subsequent development become key issues affecting development of the IoT. The "Cloud IoT" based on the "cloud computing" technology and a "cloud storage" technology provides strong support for the IoT technology and application thereof.

A description is provided by using a multi-channel data transmission method and a multi-channel data receiving method provided in this application. A transmission end configured to perform the multi-channel data transmission method and a receiving end configured to perform the multi-channel data receiving method may be IoT devices.

Figure 1:
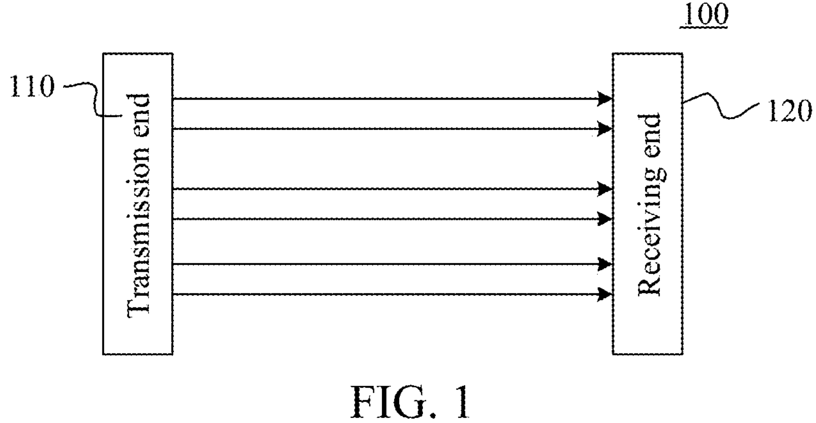
FIG. 1 shows an example of a system framework according to an embodiment of this application.

FIG. 1 shows an example of a system framework 100 according to an embodiment of this application.

As shown in FIG. 1, the system framework 100 may include a transmission end 110 and a receiving end 120. A plurality of available transmission channels may be established between the transmission end 110 and the receiving end 120. The plurality of available transmission channels may be channels established through various networks. The transmission end 110 and the receiving end 120 may be connected to a network through a network card.

The transmission end 110 and the receiving end 120 may be terminal devices, for example, at least one of a smartphone, a game console, a desktop computer, a tablet computer, an e-book reader, a moving picture experts group audio layer III (MP3) player, a moving picture experts group audio layer IV (MP4) player, and a laptop computer, but this application is not limited thereto. The transmission end 110 and the receiving end 120 may be clients, each having an application installed and running therein. The application may be any one of an online video program, a short video program, a picture sharing program, a voice-based social interaction program, a cartoon program, a wallpaper program, a news push program, a supply and demand information push program, an academic exchange program, a technical exchange program, a policy exchange programs, a program including a comment mechanism, a program including a viewpoint posting mechanism, and a knowledge sharing program.

The transmission end 110 and the receiving end 120 each may be at least one of one server, a plurality of servers, a cloud platform, and a virtualization center, and may be configured to provide backend services for applications (for example, an application in the terminal 110 and an application in the terminal 120).

The transmission end 110 and the receiving end 120 each even may be a switch, for example, a switch with a 2-layer forwarding capability, a 3-layer forwarding capability, and a route advertisement capability, the switch advertises an open shortest path first interior gateway protocol (OSPF) router, a border gateway protocol (BGP) router, or other similar routers.

Further, data packet transmission may be performed between the transmission end 110 and the receiving end 120 through a plurality of transmission channels. The data transmission through a plurality of transmission channels includes a dual transmission mode and an aggregation mode. In the dual transmission mode, the transmission end 110 replicates a to-be-transmitted data packet, and respectively transmits the two to-be-transmitted data packets in two transmission channels. When the data packet transmitted in one of the two transmission channels is lost, the receiving end 120 may receive the correct data packet in the other of the two transmission channels. In the aggregation mode, the transmission end 110 may allocate the to-be-transmitted data packet to a plurality of different transmission channels for transmission based on an allocation algorithm, and the receiving end 120 aggregates the data packets received on the transmission channels to obtain a final data packet.

In the dual transmission mode, the transmission end 110 needs to transmit the same data packet twice, which consumes large data traffic for transmission. In addition, when a rate of the to-be-transmitted data packet exceeds a bandwidth of a single channel, a packet loss may occur. In the aggregation mode, since the aggregation process performed by the receiving end 120 results in an increase in a transmission delay. Therefore, the aggregation mode is inapplicable to scenarios requiring a low delay. In addition, allocating the data packet for transmission results in a degraded packet loss prevention capability of the data packet.

In view of the above, embodiments of this application provide a multi-channel data transmission method and receiving method, a transmission end, and a receiving end. Compared to the dual transmission mode, the multi-channel data transmission method not only can reduce a quantity of to-be-transmitted data packets and save network traffic, but also can improve reliability of the data packet transmission and a transmission capability of a primary transmission channel. For example, the method enables the primary transmission channel to have a transmission capability that exceeds a bandwidth of a single channel. Compared to the aggregation mode, the multi-channel data transmission method not only can reduce a data packet transmission delay, but also can improve reliability of data packet transmission. In other words, the multi-channel data transmission method provided in this application is applicable to a scenario requiring relatively high network reliability or a relatively large bandwidth, for example, a remote video control scenario.

Figure 2:
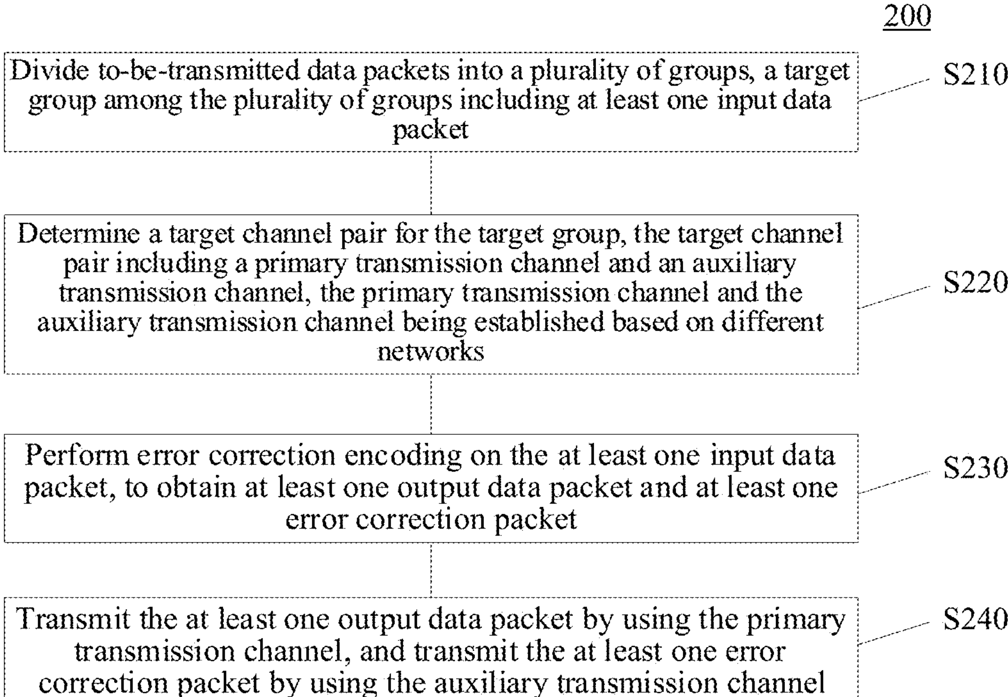
FIG. 2 is a schematic flowchart of a multi-channel data transmission method according to an embodiment of this application.

FIG. 2 is a schematic flowchart of a multi-channel data transmission method 200 according to an embodiment of this application. The method 200 may be performed by any electronic device having a plurality of transmission channels. For example, the electronic device may be a terminal device or a server. For ease of description, the multi-channel data transmission method 200 is described below by using an example in which the method is performed by a transmission end.

As shown in FIG. 2, the multi-channel data transmission method 200 may include the following operations:

S210: The transmission end divides to-be-transmitted data packets (also referred to as "transmission target data packets" or "target data packets") into a plurality of groups, a target group among the plurality of groups including at least one input data packet.

Exemplarily, the to-be-transmitted data packets include a plurality of data packets.

Exemplarily, the transmission end may equally divide the to-be-transmitted data packets into a plurality of groups based on a quantity of the to-be-transmitted data packets. A data packet in each of the plurality of groups is an input data packet.

Exemplarily, the input data packet is a data packet inputted by the transmission end during error correction encoding. In other words, the input data packet may also be referred to as a to-be-coded data packet or a data packet to which error correction encoding is to be applied, which is not specifically limited in this application.

Certainly, in other alternative embodiments, the transmission end may divide to-be-transmitted data packets into a plurality of groups in another manner. For example, the transmission end may divide the to-be-transmitted data packets into a plurality of groups based on service types of the to-be-transmitted data packets. For example, the transmission end may allocate data packets of the same service type to the same group.

Exemplarily, the transmission end divides the to-be-transmitted data packets into a plurality of groups. The plurality of groups include the target group and other groups. The target group is any group among the plurality of groups, and the other groups include a group among the plurality of groups other than the target group.

S220: The transmission end determines a target channel pair for the target group, the target channel pair including a primary transmission channel and an auxiliary transmission channel, the primary transmission channel and the auxiliary transmission channel being established based on different networks.

Exemplarily, the transmission end may allocate the target group to the target channel pair through matching. For example, assuming that a plurality of channel pairs are available for the transmission end, the transmission end may allocate the plurality of groups to the plurality of channel pairs through matching based on transmission rates of the plurality of channel pairs.

Certainly, in other alternative embodiments, the transmission end may determine the target channel pair in another manner. For example, the transmission end may determine a default channel pair as the target channel pair. The default channel pair may be a default channel pair configured for data packet transmission. For example, the transmission end may directly determine the default channel pair as a channel pair for each group among the plurality groups without matching-based allocation.

Exemplarily, during the division of the to-be-transmitted data packets into the plurality of groups, the transmission end may first determine a length of each group among the plurality of groups based on supported error correction encoding pattern samples, and then divide the to-be-transmitted data packets into the plurality of groups based on the lengths of the groups. The length of each group may be understood as a quantity of input data packets in each group.

Exemplarily, after determining the target channel pair, the transmission end may determine a transmission channel of the target channel pair with a best performance parameter as a primary transmission channel, and determine a transmission channel of the target channel pair other than the primary transmission channel as an auxiliary transmission channel. The performance parameter may be a bandwidth of a transmission channel, a delay of a transmission channel, or another parameter such as a packet loss rate of a transmission channel.

S230: The transmission end performs error correction encoding on the at least one input data packet, to obtain at least one output data packet and at least one error correction packet.

Exemplarily, the error correction encoding may be forward error correction encoding, such as Reed-Solomon codes.

Exemplarily, the output data packet is an output data packet after error correction encoding is applied thereto. In other words, the output data packet may also be referred to as an encoded data packet or a data packet to which error correction encoding is applied. Similarly, the error correction packet is a data packet configured for performing error correction decoding on a received output data packet. In other words, the output data packet may also be referred to as a data packet configured for performing error correction decoding on a received output data packet. The above is not specifically limited in this application.

Certainly, in other alternative embodiments, the error correction encoding may be another encoding manner, which is not limited in this application. For example, the error correction encoding may be another encoding manner such as cyclic check encoding.

Figure 3:
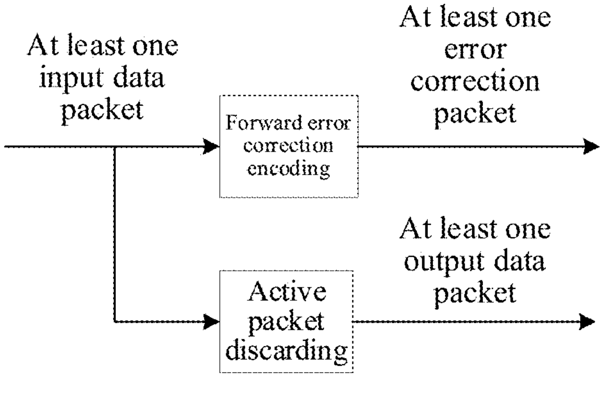
FIG. 3 is a schematic diagram showing an error correction encoding principle according to an embodiment of this application.

FIG. 3 is a schematic diagram showing an error correction encoding principle according to an embodiment of this application.

As shown in FIG. 3, during the error correction encoding on the at least one input data packet, the transmission end may first determine a puncturing rate and a redundancy for the target group, and then perform active puncturing on the at least one input data packet based on the puncturing rate for the target group, to obtain the at least one output data packet, and the transmission end performs forward error correction encoding on the at least one input data packet based on the redundancy for the target group, to obtain the at least one error correction packet.

The at least one output data packet and the at least one input data packet may be the same. The at least one output data packet may be a partial data packet of the at least one input data packet, or may be a remaining data packet of the at least one input data packet after a partial data packet is discarded.

The transmission end may multiply an encoding matrix by at least one input data packet, to achieve the active puncturing and the forward error correction encoding on the at least one input data packet, thereby obtaining both the at least one output data packet and the at least one error correction packet at one time.

Figure 4:
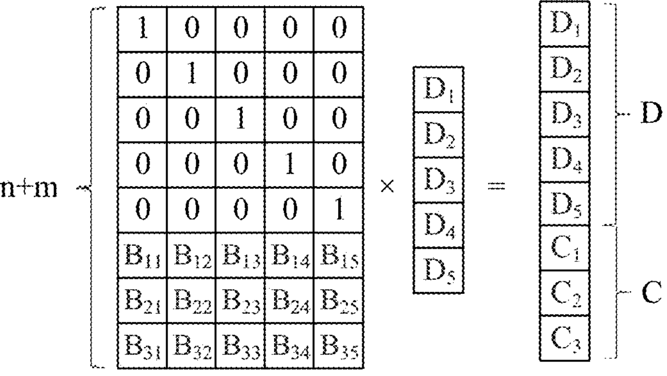
FIG. 4 shows an example of error correction encoding according to an embodiment of this application.

FIG. 4 shows an example of error correction encoding according to an embodiment of this application.

Exemplarily, assuming that the target group includes 5 input data packets (i.e., $D_1$ to $D_5$), an encoding matrix may be multiplied by a matrix formed by the 5 input data packets, to obtain a matrix formed by 5 output data packets (i.e., $D_1$ to $D_5$) and 3 error correction packets (i.e., $C_1$ to $C_5$).

Exemplarily, the at least one error correction packet may be configured for recovering the at least one input data packet. For example, the receiving end performs error correction decoding on a received output data packet based on the received error correction packet, to obtain the at least one input data packet, i.e., an original data packet. Since a packet loss may occur, the data packet received by the receiving end may be the at least one output data packet, or may be a partial data packet of the at least one output data packet. Similarly, the error correction packet received by the receiving end may be the at least one error correction packet, or may be a partial error correction packet of the at least one error correction packet.

S240: The transmission end transmits the at least one output data packet by using the primary transmission channel, and transmits the at least one error correction packet by using the auxiliary transmission channel.

Exemplarily, the transmission end may transmit the at least one error correction packet by using the auxiliary transmission channel and concurrent transmits the at least one output data packet by using the primary transmission channel.

At a moment or in a time period, the target channel pair may be a channel pair dedicated for the target group, or may be a channel pair shared by the target group and a group among the plurality of groups other than target group, or may be a channel pair shared by the target group and a group other than the plurality groups, which is not specifically limited in this application.

The group other than the plurality groups may be a group obtained by the transmission end by dividing other to-be-transmitted data packets. The other to-be-transmitted data packets may be data packets of other applications, other services, or other destinations.

In this embodiment of this application, the error correction encoding is performed on the at least one input data packet, to obtain the at least one output data packet and the at least one error correction packet; and then the at least one output data packet is transmitted by using the primary transmission channel, and the at least one error correction packet is transmitted by using the auxiliary transmission channel. Compared to a dual transmission mode, the multi-channel data transmission method avoids transmission of dual data packets, and therefore can reduce a quantity of to-be-transmitted data packets and save network traffic. In addition, the at least one error correction packet is transmitted in the auxiliary transmission channel, so that the receiving end can perform the error correction decoding on the at least one output data packet transmitted in the primary transmission channel. In this way, not only reliability of the data packet transmission can be improved, but also a transmission capability of the primary transmission channel can be improved. For example, the primary transmission channel can have a transmission capability that exceeds a bandwidth of a single channel. Compared to an aggregation mode, the multi-channel data transmission method avoids aggregation of the received data packets, and therefore can reduce a data packet transmission delay. In addition, the at least one error correction packet is transmitted in the auxiliary transmission channel, so that the receiving end can perform the error correction decoding on the at least one output data packet transmitted in the primary transmission channel. In this way, the reliability of the data packet transmission can be improved.

In short, compared to the dual transmission mode, the multi-channel data transmission method not only can reduce the quantity of to-be-transmitted data packets and save network traffic, but also can improve the reliability of the data packet transmission and the transmission capability of the primary transmission channel. For example, the method enables the primary transmission channel to have a transmission capability that exceeds a bandwidth of a single channel. Compared to the aggregation mode, the multi-channel data transmission method not only can reduce the data packet transmission delay, but also can improve the reliability of the data packet transmission.

In some embodiments, S230 may include:

obtaining a transmission performance parameter of the target channel pair; determining an encoding parameter for the target group and a transmission parameter for the target channel pair based on the transmission performance parameter, the encoding parameter including a puncturing rate and a redundancy associated with a code word, and the transmission parameter including a transmission rate; determining a group length for the target channel pair based on an input length of the code word; determining, based on the transmission rate for the target channel pair and the group length for the target channel pair, a quantity of groups inputted into the target channel pair in a unit time unit; and performing puncturing on the at least one input data based on the puncturing rate for the target group, to obtain the at least one output data packet, and performing forward error correction encoding on the at least one input data packet based on the redundancy for the target group, to obtain the at least one error correction packet, when it is determined that the inputted groups include the target group based on the quantity of the groups inputted into the target channel pair in the unit time unit, the at least one error correction packet including the encoding parameter for the target group.

Exemplarily, the transmission performance parameter is a parameter configured for measuring and describing a performance indicator during the data transmission.

Exemplarily, the transmission parameter and the encoding parameter are two different types of parameters used during the data transmission and encoding.

The transmission parameter refers to a parameter configured for describing and controlling transmission performance during the data transmission. The transmission parameter includes parameters such as a transmission rate, a bandwidth, a delay, a packet loss rate, a throughput, a jitter, and reliability, and is configured for measuring and evaluating efficiency and quality of the data transmission. The transmission parameter is intended to ensure reliable and efficient transmission of data from the transmission end to the receiving end.

The encoding parameter refers to a parameter configured for describing and controlling an encoding mode and an encoding parameter during the data encoding. The encoding parameter includes parameters such as a puncturing rate, a redundancy associated with a code word, an encoding algorithm, an encoder setting, a compression ratio, error code correction, and is configured for determining an encoding mode and a compression mode of during the data transmission. The encoding parameter is intended to optimize data transmission efficiency and data storage efficiency, and reduce data redundancy and transmission bandwidth occupation.

Exemplarily, the code word may be an encoding matrix or an encoding pattern for the forward error correction encoding. The input length of the code word may be a length of a row vector configured for forming an output data packet or an error correction packet. For example, referring to FIG. 4, the code word is an encoding matrix shown in the figure. The input length of the code word is 5.

Exemplarily, the redundancy for the target group may be a ratio of a quantity of the at least one error correction packet to a quantity of the at least one input data packet.

Exemplarily, the group length may be the quantity of the at least one input data packet.

Exemplarily, the transmission rate may be a quantity of bits transmitted per second.

Exemplarily, the unit time unit may be a time unit of at least one second, at least one minute, or another length.

Exemplarily, the transmission end may obtain the transmission performance parameter of the target channel pair by receiving feedback information from the receiving end.

Exemplarily, the transmission end determines the encoding parameter for the target group and the transmission parameter for the target channel pair based on the transmission performance parameter. The transmission performance parameter may include a packet loss rate of the target channel pair, a packet loss rate of the primary transmission channel, and a packet loss rate of the auxiliary transmission channel. To be specific, the transmission end may determine parameters such as the puncturing rate, the redundancy, and the transmission rate for the target group based on parameters such as the packet loss rate of the target channel pair, the packet loss rate of the primary transmission channel, and the packet loss rate of the auxiliary transmission channel.

Exemplarily, when the encoding parameter includes the puncturing rate, the transmission end may perform the puncturing on the at least one input data packet based on the puncturing rate for the target group, and obtain the at least one output data packet. When the encoding parameter includes the redundancy, the transmission end may perform the forward error correction encoding on the at least one output data packet based on the redundancy for the target group, and obtain the at least one error correction packet.

Certainly, in other alternative embodiments, the transmission performance parameter, the encoding parameter, or the transmission parameter may include parameters of other types, which is not specifically limited in this application. For example, the redundancy in the encoding parameter may be replaced with a parameter such as an encoding unit. For another example, the transmission parameter may further include parameters such as a group length and a transmission bandwidth. In addition, in other alternative embodiments, the transmission end may perform the puncturing on the at least one input data packet based on the puncturing rate for the target group, to obtain the at least one output data packet, perform the forward error correction encoding on the at least one input data packet based on the redundancy for the target group, and obtain the at least one error correction packet. Then the transmission end determines, based on the transmission rate for the target channel pair and the group length for the target channel pair, the quantity of groups inputted into the target channel pair in the unit time unit. The transmission end transmits the at least one output data packet by using the primary transmission channel, and transmits the at least one error correction packet by using the auxiliary transmission channel when determining that the inputted groups include the target group based on the quantity of the groups inputted into the target channel pair in the unit time unit.

In this embodiment, the encoding parameter for the target group and the transmission parameter for the target channel pair are determined based on the transmission performance parameter; the group length for the target channel pair is determined based on the input length of the code word; and it is determined, based on the transmission rate for the target channel pair and the group length for the target channel pair, the quantity of the groups inputted into the target channel pair in the unit time unit. In this way, a load of the target channel pair can be equalized.

Figure 5:
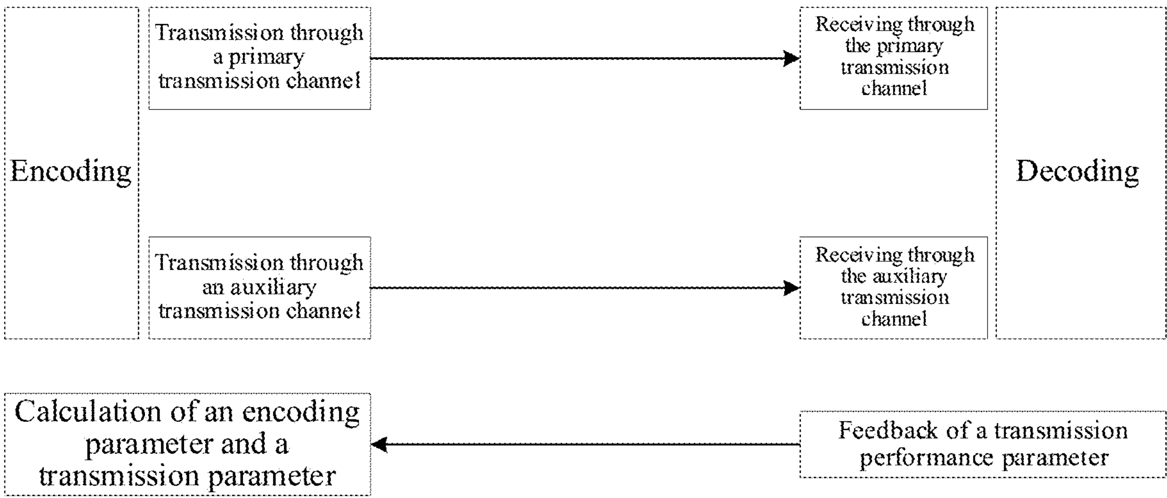
FIG. 5 is a schematic flowchart of an interaction between a transmission end and a receiving end according to an embodiment of this application.

FIG. 5 is a schematic flowchart of an interaction between the transmission end and the receiving end according to an embodiment of this application.

As shown in FIG. 5, during data transmission, the transmission end divides to-be-transmitted data packets into groups and performs the forward error correction encoding on an input data packet in each group. After the forward error correction encoding, the input data packet in each group is partitioned into an output data packet and an error correction packet. The output data packet is transmitted in the primary transmission channel, and the error correction packet is transmitted in the auxiliary transmission channel. For the input data packet of each group, an independent encoding parameter may be used, and an encoding redundancy (a ratio of a quantity of generated redundant packets to a quantity of input data packets) and a puncturing rate (puncturing means actively randomly discarding some data packets, and a puncturing rate is a proportion of discarded data packets to total data packets) may be adjusted. The error correction packet of each group may carry the encoding parameter of the input data packet of each group. The encoding parameter is configured for the receiving end to determine a decoding parameter.

Correspondingly, when receiving the data packet, the receiving end measures and calculates parameters such as a delay and a packet loss rate of data packets finally received together through different transmission channels, and feeds back the parameters to the transmission end. The transmission end may calculate an encoding parameter and a transmission parameter of each transmission channel based on the parameters such as the delay and the packet loss rate fed back by the receiving end.

In some embodiments, an encoding parameter for a previous group and a transmission parameter for the previous group are adjusted based on the transmission performance parameter, to obtain the encoding parameter for the target group and the transmission parameter for the target channel pair, the previous group being a group transmitted before the target group is transmitted by using the target channel pair.

Exemplarily, the transmission end may adjust parameters such as a puncturing rate, a redundancy, and a transmission rate for the previous group based on the parameters such as the packet loss rate of the target channel pair, the packet loss rate of the primary transmission channel, and the packet loss rate of the auxiliary transmission channel, to obtain the parameters such as the puncturing rate, the redundancy, and the transmission rate for the target group.

Exemplarily, the encoding parameter for the previous group and the transmission parameter for the previous group may be an encoding parameter and a transmission parameter for the target channel pair in a previous period. The previous period may be a measurement period in which the receiving end measures the transmission performance parameter.

In this embodiment, the encoding parameter for the previous group and the transmission parameter for the previous group are adjusted based on the transmission performance parameter, to obtain the encoding parameter for the target group and the transmission parameter for the target channel pair, which is equivalent to achieving adaptive adjustment of the encoding parameter for the target group and the transmission parameter for the target channel pair based on the transmission performance parameter, thereby improving flexibility of the data packet transmission.

In some embodiments, the transmission performance parameter includes the packet loss rate of the target channel pair, the packet loss rate of the primary transmission channel, and the packet loss rate of the auxiliary transmission channel.

The redundancy and the puncturing rate for the target group are reduced and the transmission rate for the target channel pair is increased, if the packet loss rate of the target channel pair is equal to 0 and the packet loss rate of the primary transmission channel is equal to 0.

If the packet loss rate of the target channel pair is equal to 0 and the packet loss rate of the primary transmission channel is greater than 0, the redundancy for the target group is reduced when the packet loss rate of the primary transmission channel does not exceed a first threshold, and the puncturing rate for the target group is increased when the packet loss rate of the primary transmission channel exceeds the first threshold.

The puncturing rate for the target group is reduced if the packet loss rate of the target channel pair is greater than 0 and the packet loss rate of the primary transmission channel is equal to 0.

If the packet loss rate of the target channel pair is greater than 0 and the packet loss rate of the primary transmission channel is greater than 0, the redundancy for the target group is increased when the packet loss rate of the auxiliary transmission channel is equal to 0 and the packet loss rate of the primary transmission channel does not exceed the first threshold, the puncturing rate for the target group is increased when the packet loss rate of the auxiliary transmission channel is equal to 0 and the packet loss rate of the primary transmission channel exceeds the first threshold, and the transmission rate for the target channel pair is reduced when the packet loss rate of the auxiliary transmission channel is greater than 0.

For example, assuming that the previous group includes 5 input data packets (i.e., $D_1$ to $D_5$), an encoding matrix may be multiplied by a matrix formed by the 5 input data packets, to obtain a matrix formed by 5 output data packets (i.e., $D_1$ to $D_5$) and 3 error correction packets (i.e., $C_1$ to $C_5$). In other words, the puncturing rate for the previous group is 0, and the redundancy for the previous group is 3. In this case, the receiving end receives the output data packet and the error correction packet of the previous group, and decodes and recovers the input data packet of the previous group based on the encoding parameter. In addition, the receiving end measures and feeds back the packet loss rate of the target channel pair, the packet loss rate of the primary transmission channel, and the packet loss rate of the auxiliary transmission channel.

Based on the above, the transmission end may determine the puncturing rate and the redundancy for the target group in the following manners:

When the packet loss rate of the target channel pair is greater than 0, the transmission end may increase the redundancy for the target group relative to the previous group, which is equivalent to increasing a quantity of error correction packets of the target group when a length of the target group is the same as a length of the previous group. When the packet loss rate of the target channel pair is equal to 0, but the primary transmission channel still has a packet loss that exceeds a specified packet loss threshold by 10%, the transmission end may increase a puncturing rate of the input data packet. For example, the transmission end increases a quantity of puncturing packets of the target group to 1. In other words, the transmission end randomly discards a data packet of the input data packet of the target group, to obtain the output data packet of the target group. When the packet loss rate of the primary transmission channel is equal to 0 and the packet loss rate of the target channel pair is equal to 0, the transmission end may attempt to further reduce the redundancy and the puncturing rate. If the reduction results in a packet loss, a current redundancy and puncturing rate are maintained.

Exemplarily, the first threshold may be a value specified in a standard protocol or a value read from a memory of the transmission end.

In this embodiment, the encoding parameter for the previous group and the transmission parameter for the previous group are adjusted based on the packet loss rate of the target channel pair, the packet loss rate of the primary transmission channel, and the packet loss rate of the auxiliary transmission channel, to obtain the encoding parameter for the target group and the transmission parameter for the target channel pair, which is equivalent to achieving adaptive adjustment of the encoding parameter for the target group and the transmission parameter for the target channel pair based on the transmission performance parameter, thereby improving the flexibility of the data packet transmission.

Certainly, in other alternative embodiments, the encoding parameter for the previous group and the transmission parameter for the previous group may be adjusted based on the transmission performance parameter in another manner, which is not specifically limited in this application.

For example, alternatively, the receiving end may adjust the encoding parameter for the previous group and the transmission parameter for the previous group based on only the packet loss rate of the target channel pair, the packet loss rate of the primary transmission channel, or the packet loss rate of the auxiliary transmission channel. For another example, the receiving end may adjust the encoding parameter for the previous group and the transmission parameter for the previous group based on a change trend of the transmission performance parameter. In a possible implementation, the encoding parameter for the previous group and the transmission parameter for the previous group may be the encoding parameter and the transmission parameter for the target channel pair in the previous period. The previous period may be a measurement period in which the receiving end measures the transmission performance parameter. In this case, if the transmission performance parameter decreases, the transmission end may determine the encoding parameter and the transmission parameter used in a previous period of the previous period as the encoding parameter and the transmission parameter for the target group.

In this embodiment, increasing or reducing the puncturing rate of the target group may mean using an increased or reduced puncturing rate for the previous group as the puncturing rate for the target group. To be specific, the increasing the puncturing rate of the target group is equivalent to that the puncturing rate for the target group is greater than the puncturing rate for the previous group, and the reducing the puncturing rate of the target group is equivalent to that the puncturing rate for the target group is less than the puncturing rate for the previous group.

In addition, a specific implementation of increasing or reducing the puncturing rate (or the redundancy or the transmission rate) of the target group is not limited in this application.

For example, to increase or reduce the puncturing rate of the target group, the transmission end may increase or reduce the puncturing rate of the target group based on a specific step. For another example, the transmission end may select a candidate value less than or greater than the puncturing rate of the previous group from a plurality of candidate values (which may also be referred to as a plurality of discrete values) as the puncturing rate of the target group. For example, assuming that the plurality of candidate values are ranked in descending order, a previous candidate value may be selected as the puncturing rate of the target group based on the puncturing rate of the previous group when the puncturing rate of the target group is to be increased, and a next candidate value may be selected as the puncturing rate of the target group based on the puncturing rate of the previous group when the puncturing rate of the target group is to be reduced.

In some embodiments, an encoding parameter corresponding to the transmission performance parameter is determined as the encoding parameter for the target group, and a transmission parameter corresponding to the transmission performance parameter is determined as the transmission parameter for the target channel pair.

Exemplarily, the transmission end may determine the encoding parameter corresponding to the transmission performance parameter as the encoding parameter for the target group and determine the transmission parameter corresponding to the transmission performance parameter as the transmission parameter for the target channel pair based on mapping relationship information. The mapping relationship information may include at least one performance parameter, an encoding parameter corresponding to each of the at least one performance parameter, and a transmission parameter corresponding to each performance parameter. The at least one performance parameter includes the transmission performance parameter. In some embodiments, the mapping relationship information may be implemented as a table or stored in a database. In other words, the transmission end may determine the encoding parameter corresponding to the transmission performance parameter as the encoding parameter for the target group and determine the transmission parameter corresponding to the transmission performance parameter as the transmission parameter for the target channel pair through table lookup or database query.

In this embodiment, the encoding parameter corresponding to the transmission performance parameter is determined as the encoding parameter for the target group, and the transmission parameter corresponding to the transmission performance parameter is determined as the transmission parameter for the target channel pair. In this way, a transmission success rate of the target group can be ensured.

In some embodiments, S220 may include:

obtaining a plurality of available transmission channels; dividing the plurality of transmission channels into a plurality of channel pairs; and performing matching on the plurality of groups and the plurality of channel pairs based on a ratio between transmission rates of the plurality of channel pairs, and obtaining the target channel pair.

Exemplarily, the plurality of available transmission channels may be all established transmission channels. Alternatively, the plurality of available transmission channels may be some of all established transmission channels. A quantity of the part of transmission channels may be a value specified in a standard protocol or a value read from the memory of the transmission end.

To be specific, the transmission end may allocate the plurality of groups to available channel pairs among the plurality of channel pairs through matching based on the ratio between the transmission rates of the plurality of channel pairs, thereby obtaining a matching channel pair allocated for each group among the plurality of groups.

Exemplarily, the transmission end may further divide the plurality of groups into a plurality of group sets. The ratio between the transmission rates of the plurality of channel pairs is positively correlated with a ratio between quantities of groups in all of the plurality of group sets. For example, the ratio between the transmission rates of the plurality of channel pairs is equal to the ratio of the quantities of groups in all of the plurality of group sets. For example, in a case that a quantity of the plurality of groups is greater than a quantity of the plurality of channel pairs, the transmission end may further divide the plurality of groups into a plurality of group sets.

In this embodiment, matching is performed on the plurality of groups and the plurality of channel pairs based on the ratio between the transmission rates of the plurality of channel pairs, and the target channel pair is obtained. In this way, a load of the plurality of channel pairs can be equalized, thereby improving data transmission performance of the plurality of channel pairs.

Certainly, in other alternative embodiments, the transmission end may determine the target channel pair in another encoding manner, which is not specifically limited in this application.

For example, the transmission end may directly determine the target channel pair based on the transmission rate of each of the plurality of channel pairs. As a possible implementation, the transmission end may first rank the transmission rates of the plurality of channel pairs in descending order, and then successively allocate groups to the plurality of current channel pairs through matching in the arrangement sequence of the plurality of channel pairs. The transmission rates of the current channel pairs match a quantity of matching groups allocated to the current channel pairs.

For matching on a plurality of groups and a plurality of channel pairs, different groups may be allocated to different channel pairs through matching based on an allocation algorithm, but the one group may be allocated to only one channel pair through matching.

Figure 6:
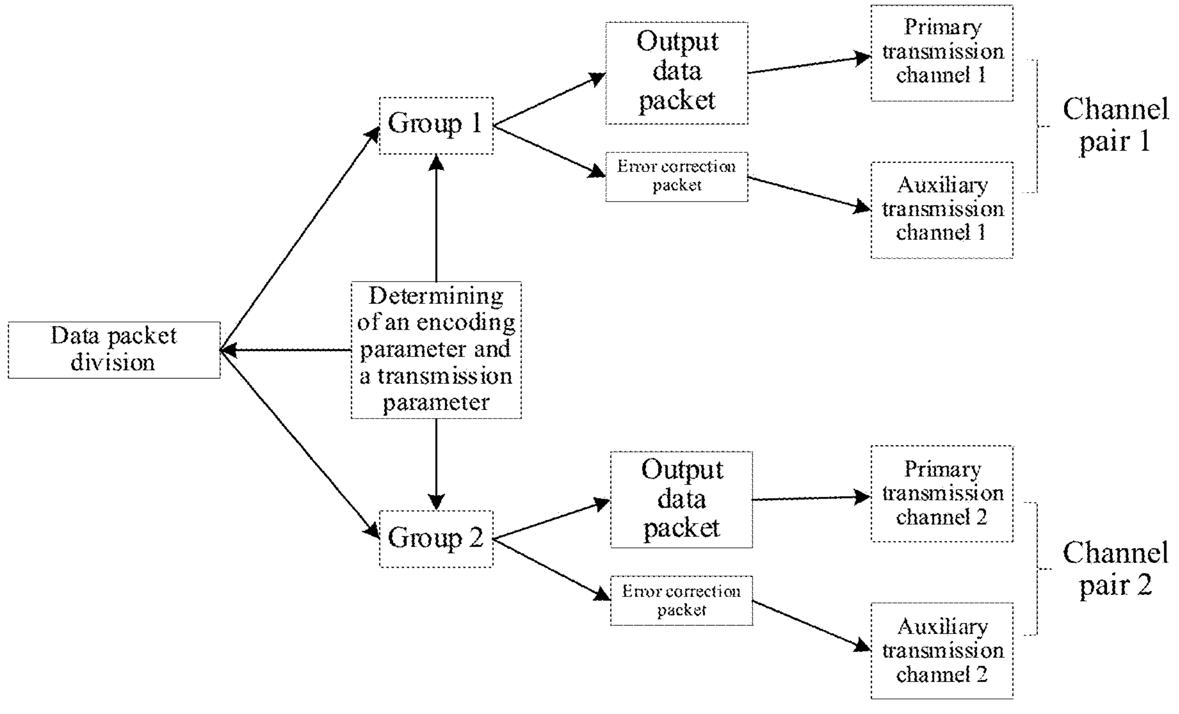
FIG. 6 shows an example of a multi-channel data transmission method according to an embodiment of this application.

FIG. 6 shows an example of a multi-channel data transmission method according to an embodiment of this application.

As shown in FIG. 6, it is assumed that the transmission end divides the to-be-transmitted data packets into group 1 and group 2. When the transmission end allocates group 1 to channel pair 1 and allocates group 2 to channel pair 2 through matching, the transmission end may obtain an output data packet of group 1 and an error correction packet of group 1 based on an input data packet of group 1 and an encoding parameter of group 1, and transmit the output data packet of group 1 in primary transmission channel 1 and transmit the error correction packet of group 1 in auxiliary transmission channel 1 based on a transmission parameter of group 1. Similarly, the transmission end may obtain an output data packet of group 2 and an error correction packet of group 2 based on an input data packet of group 2 and an encoding parameter of group 2, and transmit the output data packet of group 2 in primary transmission channel 2 and transmit the error correction packet of group 2 in auxiliary transmission channel 2 based on a transmission parameter of group 2.

In some embodiments, the plurality of transmission channels are ranked in descending order of transmission rates of the transmission channels or in ascending order of delays of the transmission channels, and an arrangement sequence of the plurality of transmission channels is obtained. At least one transmission channel ranked first among the plurality of transmission channels, i.e., located at front in the arrangement sequence, is determined as at least one primary transmission channel based on the arrangement sequence and a quantity of the plurality of transmission channels or an average bandwidth of the plurality of transmission channels. Transmission channels among the plurality of transmission channels other than the at least one primary transmission channel are determined as a maximum auxiliary channel set. During determining of an auxiliary transmission channel of each of the at least one primary transmission channel based on the arrangement sequence, the maximum auxiliary channel set is used as an initial value of a remaining channel set, a frontmost transmission channel in the remaining channel set is determined as an auxiliary transmission channel of a current primary transmission channel, and the frontmost transmission channel is removed from the remaining channel set, until the auxiliary transmission channels of all of the primary transmission channels are obtained, and the plurality of channel pairs are obtained.

Assuming that the transmission end supports or may use a plurality of transmission channels, the transmission end may obtain the plurality of channel pairs in the following manners:

1. At least one primary transmission channel is determined.

Exemplarily, the transmission end may use half of the plurality of transmission channels as the primary transmission channel or determine a channel with a bandwidth exceeding the average bandwidth of the plurality of transmission channel pairs as the primary transmission channel.

2. The plurality of transmission channels are ranked, to obtain an arrangement sequence of the plurality of transmission channels.

Exemplarily, the transmission end may rank the plurality of transmission channels in descending order of the transmission rates of the transmission channels or in ascending order of the delays of the transmission channels, and obtain the arrangement sequence of the plurality of transmission channels; determine the transmission channels among the plurality of transmission channels other than the at least one primary transmission channel as the maximum auxiliary channel set.

3. An auxiliary transmission channel of each of the at least one primary transmission channel is determined based on the maximum auxiliary channel set.

Exemplarily, the transmission end may record a current remaining channel set as the maximum auxiliary channel set. Then during the determining of the auxiliary transmission channel of each of the at least one primary transmission channel based on the arrangement sequence, the transmission end may use the maximum auxiliary channel set as the initial value of the remaining channel set, use the frontmost transmission channel in the remaining channel set as the auxiliary transmission channel of the current primary transmission channel, and remove the frontmost transmission channel from the remaining channel set, until the auxiliary transmission channels of all of the primary transmission channels are obtained, and obtain the plurality of channel pairs.

Exemplarily, assuming that the at least one primary transmission channel includes N transmission channels, and the plurality of transmission channels include M transmission channels, where N is equal to M−N, the transmission end may determine an $(M-N+i)^{th}$ channel as an auxiliary transmission channel of an $i^{th}$ primary transmission channel based on the arrangement sequence of the M transmission channels, where i=1, 2, . . . , N.

In other alternative embodiments, M may be greater than or equal to M−N.

To be specific, when the transmission end supports or may use a relatively large quantity of transmission channels, a plurality of primary transmission channels and a plurality of auxiliary transmission channels may exist. Each primary transmission channel needs to be associated with an auxiliary transmission channel, to form a primary and auxiliary transmission channel pair. However, different primary transmission channels may be associated with the same auxiliary transmission channel. For example, when M is greater than M−N, different primary transmission channels may be associated with the same auxiliary transmission channel. A plurality of transmission channels even may virtually form an auxiliary transmission channel through aggregation or dual transmission.

In this embodiment, the plurality of transmission channels are ranked in descending order of the transmission rates of the transmission channels or in ascending order of the delays of the transmission channels. In this way, channel allocation efficiency can be improved.

In some embodiments, the remaining channel set is reset to the maximum auxiliary channel set and the auxiliary transmission channel of each primary transmission channel is further determined in the remaining channel set based on the arrangement sequence, until the auxiliary transmission channels of all of the primary transmission channels are obtained, when a quantity of transmission channels in the remaining channel set is 0 if a quantity of the at least one primary transmission channel is greater than a quantity of transmission channels in the maximum auxiliary channel set, and the plurality of channel pairs are obtained.

Exemplarily, assuming that the at least one primary transmission channel includes N transmission channels, and the plurality of transmission channels include M transmission channels, where N is greater than M−N, the transmission end may determine an $(M-N+i)^{th}$ channel as an auxiliary transmission channel of an $i^{th}$ primary transmission channel based on the arrangement sequence of the M transmission channels. Further, when the quantity of transmission channels in the remaining channel set is 0, the remaining channel set may be reset to M−N, and the $(M-N+i)^{th}$ channel may be further determined as the auxiliary transmission channel of the $i^{th}$ primary transmission channel, and so on, until the auxiliary transmission channels of all of the primary transmission channels are obtained, thereby obtaining the plurality of channel pairs.

In this embodiment of this application, when the quantity of transmission channels in the remaining channel set is 0, the remaining channel set is reset to the maximum auxiliary channel set, and the auxiliary transmission channel of each primary transmission channel is further determined in the remaining channel set based on the arrangement sequence. In this way, it can be ensured that each primary transmission channel is allocated with an auxiliary transmission channel.

In some embodiments, if the quantity of the at least one primary transmission channel is less than the quantity of transmission channels in the maximum auxiliary channel set, after an auxiliary transmission channel of a last one of the at least one primary transmission channel is obtained, the auxiliary transmission channel of each primary transmission channel is further determined in the remaining channel set based on the arrangement sequence, until a quantity of transmission channels in the remaining channel set is 0, thereby obtaining the plurality of channel pairs.

Exemplarily, assuming that the at least one primary transmission channel includes N transmission channels, and the plurality of transmission channels include M transmission channels, where N is less than M−N, the transmission end may determine an $(M-N+(N\times j)+i)^{th}$ as an auxiliary transmission channel of an $i^{th}$ primary transmission channel based on the arrangement sequence of the M transmission channels, where i=1, 2, . . . , N, and J is an integer and has an initial value of 0. To be specific, the transmission end first determines that j=0, and then may determine an $(M-N+i)^{th}$ channel as the auxiliary transmission channel of the $i^{th}$ primary transmission channel based on the arrangement sequence of the M transmission channels. Next, the transmission end may determine that j=2, and then may determine the $(M-N+N+i)^{th}$ channel as the auxiliary transmission channel of the $i^{th}$ primary transmission channel based on the arrangement sequence of the M transmission channels, and so on, until the quantity of transmission channels in the remaining channel set is 0, thereby obtaining the plurality of channel pairs.

In this embodiment of this application, after the auxiliary transmission channel of the last one of the at least one primary transmission channel is obtained, the auxiliary transmission channel of each primary transmission channels is further determined in the remaining channel set based on the arrangement sequence. In this way, it can be ensured that each of the plurality of transmission channels other than the at least one primary transmission channel is allocated with a matching auxiliary transmission channel.

In some embodiments, the method 200 may further include:

receiving feedback information, the feedback information including an identifier of a group to which a lost data packet belongs and an identifier of the lost data packet in the group; generating retransmission data packets of the lost data packet based on the feedback information; dividing the retransmission data packets into a plurality of retransmission groups, a target retransmission group among the plurality of retransmission groups including at least one input retransmission data packet; determining a retransmission channel pair for the target retransmission group among the plurality of retransmission groups; performing the error correction encoding on at least one input retransmission data packet, to obtain at least one output retransmission data packet and at least one retransmission error correction packet; and transmitting the at least one output retransmission data packet by using a primary transmission channel of the retransmission channel pair, and transmitting the at least one retransmission error correction packet by using an auxiliary transmission channel of the retransmission channel pair.

In other words, during data receiving, the receiving end receives the output data packet in the primary transmission channel. When detecting a packet loss of the output data packet in the primary transmission channel, the receiving end determines a first group in which the lost data packet is located, performs, based on an error correction packet belonging to the first group received in the primary transmission channel, error correction decoding on an output data packet belonging to the first group received in the auxiliary transmission channel, and attempts to recover the lost data packet through the error correction decoding, thereby obtaining an input data packet (i.e., an original data packet) of the first group. If the recovery fails, the packet loss is fed back to the transmission end through an ACK/NACK mechanism.

Exemplarily, the retransmission channel pair may be a channel pair among the channel pairs that are supported or may be used by the transmission end having a smallest packet loss rate. For example, the retransmission channel pair may be a channel pair among the channel pairs that are supported or may be used by the transmission end having a smallest packet loss rate, or having a smallest packet loss rate in a primary transmission channel, or having a smallest packet loss rate in an auxiliary transmission channel.

In this embodiment, the retransmission data packets are divided into the plurality of retransmission groups, the target retransmission group among the plurality of retransmission groups including the at least one input retransmission data packet; the error correction encoding is performed on at least one input retransmission data packet, to obtain the at least one output retransmission data packet and the at least one retransmission error correction packet; and the at least one output retransmission data packet is transmitted by using the primary transmission channel of the retransmission channel pair, and the at least one retransmission error correction packet is transmitted by using the auxiliary transmission channel of the retransmission channel pair. Compared to the dual transmission mode, not only a quantity of to-be-transmitted retransmission data packets can be reduced and network traffic can be saved, but also reliability of the retransmission data packet transmission and a transmission capability of the primary transmission channel of the retransmission channel pair can be improved. For example, the primary transmission channel can have a transmission capability that exceeds a bandwidth of a single channel. Compared to the aggregation mode, not only a transmission delay of the retransmission data packet can be reduced, but also the reliability of the retransmission data packet transmission can be improved.

Certainly, in other alternative embodiments, the retransmission data packet of the lost data packet may be directly transmitted in a mode such as the dual transmission mode or the aggregation mode, to improve a success rate of correctly receiving the retransmission data packet of the lost data packet. In the dual transmission mode, the transmission end replicates the to-be-transmitted data packet, and respectively transmits the two to-be-transmitted data packets in two transmission channels. In the aggregation mode, the transmission end may allocate the to-be-transmitted data packet to a plurality of different transmission channels for transmission based on an allocation algorithm.

The preferred implementations of this application are described in detail above with reference to the drawings. However, this application is not limited to the specific details in the above implementations. A plurality of simple variations may be made to the technical solutions of this application within the scope of the technical concept of this application, and the simple variations fall within the protection scope of this application. For example, the specific technical features described in the above specific implementations may be combined in any proper manner in case of no contradiction. To avoid unnecessary repetition, possible combinations are not described in this application. For another example, various different implementations of this application may be combined in different ways without departing from the idea of this application, and the combinations are still regarded as the content disclosed in this application.

The sequence numbers of the processes in the method embodiments of this application do not mean execution sequences. The execution sequences of the processes are determined based on functions and internal logic of the processes, and are not construed as any limitation on the implementation processes of the embodiments of this application.

The multi-channel data transmission method provided in the embodiments of this application is described above in detail from a perspective of the transmission end with reference to FIG. 2 to FIG. 6. A multi-channel data receiving method provided in the embodiments of this application is described below from a perspective of a receiving end with reference to FIG. 7.

Figure 7:
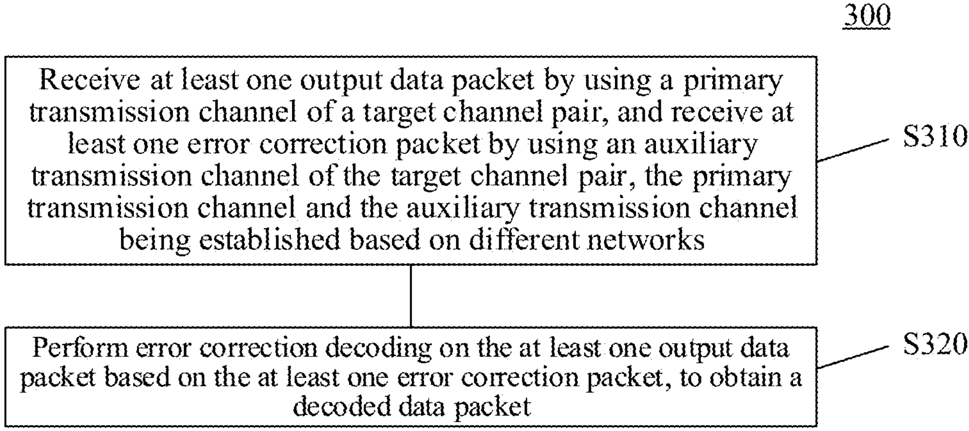
FIG. 7 is a schematic flowchart of a multi-channel data receiving method according to an embodiment of this application.

FIG. 7 is a schematic flowchart of a multi-channel data receiving method 300 according to an embodiment of this application. The method 300 may be performed by any electronic device having a plurality of transmission channels. For example, the electronic device may be a terminal device or a server. For ease of description, the multi-channel data receiving method 300 is exemplarily described below by using a receiving end as an example.

As shown in FIG. 7, the multi-channel data receiving method 300 may include the following operations:

S310: The receiving end receives at least one output data packet by using a primary transmission channel of a target channel pair, and receives at least one error correction packet by using an auxiliary transmission channel of the target channel pair, the primary transmission channel and the auxiliary transmission channel being established based on different networks; and S320: The receiving end performs error correction decoding on the at least one output data packet based on the at least one error correction packet, to obtain a decoded data packet.

Exemplarily, during data receiving, the receiving end receives the output data packet in the primary transmission channel. When detecting a packet loss of the output data packet in the primary transmission channel, the receiving end determines a first group in which the lost data packet is located, performs, based on an error correction packet belonging to the first group received in the primary transmission channel, error correction decoding on an output data packet belonging to the first group received in the auxiliary transmission channel, and attempts to recover the lost data packet through the error correction decoding, thereby obtaining an input data packet (i.e., an original data packet) of the first group. If the recovery fails, the packet loss is fed back to the transmission end through an ACK/NACK mechanism. For example, the error correction packet of the first group carries an encoding parameter of the first group, and the receiving end performs the error correction decoding on the data packet received in the primary transmission channel based on the error correction packet of the first group, to obtain the decoded data packet.

For operations of the multi-channel data receiving method 300, reference may be made to the corresponding operations of the multi-channel data transmission method 200, which are not described herein for brevity.

The methods provided in the embodiments of this application are described above. Apparatuses provided in the embodiments of this application are described below.

Figure 8:
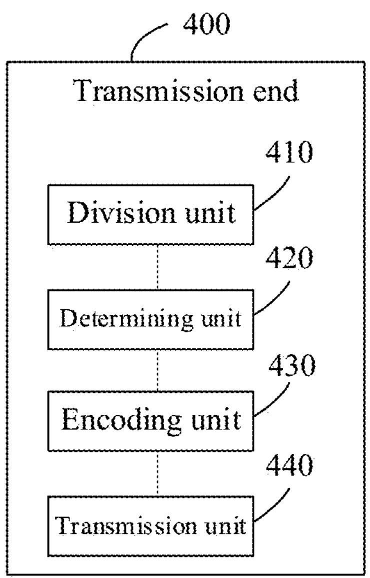
FIG. 8 is a schematic block diagram of a transmission end according to an embodiment of this application.

FIG. 8 is a schematic block diagram of a transmission end 400 according to an embodiment of this application.

As shown in FIG. 8, the transmission end 400 may include:

- a division unit 410, configured to divide to-be-transmitted data packets into a plurality of groups, a target group among the plurality of groups including at least one input data packet;
- a determining unit 420, configured to determine a target channel pair for the target group, the target channel pair including a primary transmission channel and an auxiliary transmission channel, the primary transmission channel and the auxiliary transmission channel being established based on different networks;
- a encoding unit 430, configured to perform error correction encoding on the at least one input data packet, to obtain at least one output data packet and at least one error correction packet; and
- a transmission unit 440, configured to: transmit the at least one output data packet by using the primary transmission channel, and transmit the at least one error correction packet by using the auxiliary transmission channel.

In some embodiments, the encoding unit 430 is specifically configured to:

- obtain a transmission performance parameter of the target channel pair;
- determine an encoding parameter for the target group and a transmission parameter for the target channel pair based on the transmission performance parameter, the encoding parameter including a puncturing rate and a redundancy associated with a code word, and the transmission parameter including a transmission rate;
- determine a group length for the target channel pair based on an input length of the code word;
- determine, based on the transmission rate for the target channel pair and the group length for the target channel pair, a quantity of groups inputted into the target channel pair in a unit time unit; and
- perform puncturing on the at least one input data based on the puncturing rate for the target group, to obtain the at least one output data packet, and perform forward error correction encoding on the at least one input data packet based on the redundancy for the target group, to obtain the at least one error correction packet, when it is determined that the inputted groups include the target group based on the quantity of the groups inputted into the target channel pair in the unit time unit, the at least one error correction packet including the encoding parameter for the target group.

In some embodiments, the encoding unit 430 is specifically configured to:

- adjust an encoding parameter for a previous group and a transmission parameter for the previous group based on the transmission performance parameter, to obtain the encoding parameter for the target group and the transmission parameter for the target channel pair,
- the previous group being a group transmitted before the target group is transmitted by using the target channel pair.

In some embodiments, the transmission performance parameter includes a packet loss rate of the target channel pair, a packet loss rate of the primary transmission channel, and a packet loss rate of the auxiliary transmission channel. Further, the encoding unit 430 is specifically configured to:

- reduce the redundancy and the puncturing rate for the target group and increase the transmission rate for the target channel pair, if the packet loss rate of the target channel pair is equal to 0 and the packet loss rate of the primary transmission channel is equal to 0;
- if the packet loss rate of the target channel pair is equal to 0 and the packet loss rate of the primary transmission channel is greater than 0,
- reduce the redundancy for the target group when the packet loss rate of the primary transmission channel does not exceed a first threshold, and increase the puncturing rate for the target group when the packet loss rate of the primary transmission channel exceeds the first threshold; and reduce the puncturing rate for the target group if the packet loss rate of the target channel pair is greater than 0 and the packet loss rate of the primary transmission channel is equal to 0; and if the packet loss rate of the target channel pair is greater than 0 and the packet loss rate of the primary transmission channel is greater than 0, increase the redundancy for the target group when the packet loss rate of the auxiliary transmission channel is equal to 0 and the packet loss rate of the primary transmission channel does not exceed the first threshold, increase the puncturing rate for the target group when the packet loss rate of the auxiliary transmission channel is equal to 0 and the packet loss rate of the primary transmission channel exceeds the first threshold, and reduce the transmission rate for the target channel pair when the packet loss rate of the auxiliary transmission channel is greater than 0.

In some embodiments, the encoding unit 430 is specifically configured to:

determine an encoding parameter corresponding to the transmission performance parameter as the encoding parameter for the target group, and determine a transmission parameter corresponding to the transmission performance parameter as the transmission parameter for the target channel pair.

In some embodiments, the determining unit 420 is specifically configured to:

obtain a plurality of available transmission channels;

divide the plurality of transmission channels into a plurality of channel pairs; and perform matching on the plurality of groups and the plurality of channel pairs based on a ratio between transmission rates of the plurality of channel pairs, and obtain the target channel pair.

In some embodiments, the determining unit 420 is specifically configured to:

rank the plurality of transmission channels in descending order of transmission rates of the transmission channels or in ascending order of delays of the transmission channels, and obtain an arrangement sequence of the plurality of transmission channels;

determine at least one transmission channel ranked first among the plurality of transmission channels as at least one primary transmission channel based on the arrangement sequence and a quantity of the plurality of transmission channels or an average bandwidth of the plurality of transmission channels;

determine transmission channels among the plurality of transmission channels other than the at least one primary transmission channel as a maximum auxiliary channel set; and during determining of an auxiliary transmission channel of each of the at least one primary transmission channel based on the arrangement sequence, use the maximum auxiliary channel set as an initial value of a remaining channel set, determine a frontmost transmission channel in the remaining channel set as an auxiliary transmission channel of a current primary transmission channel, and remove the frontmost transmission channel from the remaining channel set, until the auxiliary transmission channels of all of the primary transmission channels are obtained, and obtain the plurality of channel pairs.

In some embodiments, the determining unit 420 is specifically configured to:

reset the remaining channel set to the maximum auxiliary channel set and further determine the auxiliary transmission channel of each primary transmission channel in the remaining channel set based on the arrangement sequence, until the auxiliary transmission channels of all of the primary transmission channels are obtained, when a quantity of transmission channels in the remaining channel set is 0 if a quantity of the at least one primary transmission channel is greater than a quantity of transmission channels in the maximum auxiliary channel set, and obtain the plurality of channel pairs.

In some embodiments, the determining unit 420 is specifically configured to:

further determine the auxiliary transmission channel of each primary transmission channel in the remaining channel set based on the arrangement sequence, until a quantity of transmission channels in the remaining channel set is 0, when an auxiliary transmission channel of a last one of the at least one primary transmission channel is obtained if the quantity of the at least one primary transmission channel is less than the quantity of transmission channels in the maximum auxiliary channel set, and obtain the plurality of channel pairs.

In some embodiments, the division unit 410 is further configured to:

receive feedback information, the feedback information including an identifier of a group to which a lost data packet belongs and an identifier of the lost data packet in the group;

generate retransmission data packets of the lost data packet based on the feedback information; and divide the retransmission data packets into a plurality of retransmission groups, a target retransmission group among the plurality of retransmission groups including at least one input retransmission data packet;

The determining unit 420 is further configured to determine a retransmission channel pair for the target retransmission group among the plurality of retransmission groups.

The encoding unit 430 is further configured to perform the error correction encoding on at least one input retransmission data packet, to obtain at least one output retransmission data packet and at least one retransmission error correction packet.

The transmission unit 440 is further configured to transmit the at least one output retransmission data packet by using a primary transmission channel of the retransmission channel pair, and transmit the at least one retransmission error correction packet by using an auxiliary transmission channel of the retransmission channel pair.

The apparatus embodiments and the method embodiments may correspond to each other. For similar descriptions, reference may be made to the method embodiments. To avoid repetition, details are not described herein. Specifically, the transmission end 400 may correspond to the corresponding execution body of the method 200 of the embodiments of this application, and the units of the transmission end 400 respectively implement the corresponding processes in the method 200. For brevity, details are not described herein.

Figure 9:
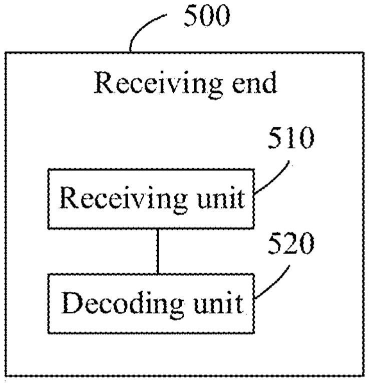
FIG. 9 is a schematic block diagram of a receiving end according to an embodiment of this application.

FIG. 9 is a schematic block diagram of a receiving end 500 according to an embodiment of this application.

As shown in FIG. 9, the receiving end 500 may include:

a receiving unit 510, configured to receive at least one output data packet by using a primary transmission channel of a target channel pair, and receive at least one error correction packet by using an auxiliary transmission channel of the target channel pair, the primary transmission channel and the auxiliary transmission channel being established based on different networks; and a decoding unit 520, configured to perform error correction decoding on the at least one output data packet based on the at least one error correction packet, to obtain a decoded data packet.

The apparatus embodiments and the method embodiments may correspond to each other. For similar descriptions, reference may be made to the method embodiments. To avoid repetition, details are not described herein. Specifically, the receiving end 500 may correspond to the corresponding execution body of the method 300 of the embodiments of this application, and the units of the receiving end 500 respectively implement the corresponding processes in the method 300. For brevity, details are not described herein.

The units of the transmission end 400 or the receiving end 500 involved in the embodiments of this application may be respectively or all combined into one or a plurality of other units, or one (some) of the units may be further split into a plurality of small units by functions, which can realize the same operation without affecting the realization of the technical effects of the embodiments of this application. The above units are divided based on logical functions. During an actual application, functions of one unit may be implemented by a plurality of units, or functions of a plurality of units may be implemented by one unit. In other embodiments of this application, the transmission end 400 or the receiving end 500 may include another unit. During an actual application, the functions may be implemented with assistance of another unit, and may be implemented with assistance of a plurality of units. According to another embodiment of this application, a computer program (including program code) that can perform the operations involved in the corresponding methods may be run in a general-purpose computer device such as a general-purpose computer including processing elements such as a central processing unit (CPU), a random access memory (RAM), and a read-only memory (ROM) and storage elements, to construct the transmission end 400 or the receiving end 500 in the embodiments of this application, thereby implementing the methods provided in the embodiments of this application. The computer program may be recorded in, for example, a computer-readable storage medium, loaded in an electronic device through the computer-readable storage medium, and run in the electronic device, to implement the corresponding methods in the embodiments of this application.

In other words, the above units may be implemented in a form of hardware, or may be implemented by instructions in a form of software, or may be implemented in a form of a combination of hardware and software. Specifically, the operations of the method embodiments of the embodiments of this application may be completed by using an integrated logic circuit of hardware in a processor and/or instructions in a form of software. The operations of the methods disclosed in combination with the embodiments of this application may be directly performed and completed by hardware of a decoding processor, or may be performed and completed by a combination of hardware and the software of the decoding processor. In some embodiments, the software may be located in a mature storage medium in the art, such as a RAM, a flash memory, a ROM, a programmable read-only memory (PROM), an electrically erasable programmable memory, and a register. The storage medium is located in a memory, and a processor reads information in the memory and completes the operations of the above method embodiments in combination with hardware of the processor.

Figure 10:
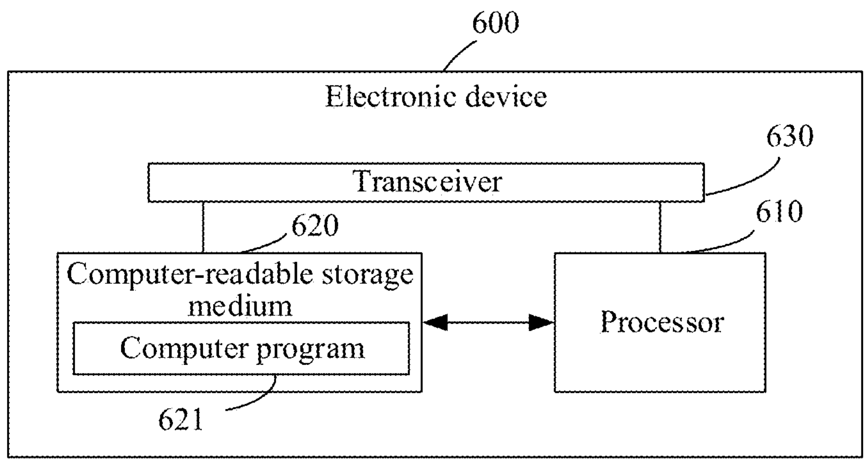
FIG. 10 is a schematic block diagram of an electronic device according to an embodiment of this application.

FIG. 10 is a schematic structural diagram of an electronic device 600 according to an embodiment of this application.

As shown in FIG. 10, the electronic device 600 includes at least a processor 610 and a computer-readable storage medium 620. The processor 610 and the computer-readable storage medium 620 may be connected by a bus or in another manner. The computer-readable storage medium 620 is configured to store a computer program 621. The computer program 621 includes computer instructions. The processor 610 is configured to execute the computer instructions stored in the computer-readable storage medium 620. The processor 610 is a computing core and a control core of the electronic device 600, and is configured to implement one or more computer instructions. Specifically, the processor is configured to load and execute the one or more computer instructions to implement the corresponding method processes or corresponding functions.

In an example, the processor 610 may also be referred to as a CPU. The processor 610 may include but is not limited to a general-purpose processor, a digital signal processor (DSP), an application-specific integrated circuit (ASIC), a field-programmable gate array (FPGA) or another programmable logic device, a discrete gate or a transistor logic device, and a discrete hardware component.

In an example, the computer-readable storage medium 620 may be a high-speed RAM, or may be a non-volatile memory, for example, at least one disk memory. In some embodiments, the computer-readable storage medium may be at least one computer-readable storage medium away from the processor 610. Specifically, the computer-readable storage medium 620 may include but is not limited to a volatile memory and/or a non-volatile memory. The non-volatile memory may be a ROM, a PROM, an erasable programmable read-only memory (EPROM), an electrically erasable programmable read-only memory (EEPROM), or a flash memory. The volatile memory may be a RAM, which serves as an external cache. By way of example but not limitation, many forms of RAMs, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM) may be used.

As shown in FIG. 10, the electronic device 600 may further include a transceiver 630.

The processor 610 may control the transceiver 630 to communicate with another device. Specifically, the transceiver may transmit information or data to the another device, or may receive information or data transmitted by the another device. The transceiver 630 may include a transmitter and/or a receiver. The transceiver 630 may further include one or more antennas.

The components of the electronic device 600 are connected through a bus system. In addition to a data bus, the bus system further includes a power bus, a control bus, and a status signal bus. The electronic device 600 may be any electronic device having a data processing capability. The computer-readable storage medium 620 has a first computer instruction stored therein. The first computer instruction stored in the computer-readable storage medium 620 is loaded and executed by the processor 610, to implement the corresponding operations of the method 200. During a specific implementation, the first computer instruction in the computer-readable storage medium 620 is loaded and executed by the processor 610 to perform the corresponding operations. Similarly, the computer-readable storage medium 620 has a second computer instruction stored therein. The second computer instruction stored in the computer-readable storage medium 620 is loaded and executed by the processor 610, to implement the corresponding operations of the method 300. During a specific implementation, the second computer instruction in the computer-readable storage medium 620 is loaded and executed by the processor 610 to perform the corresponding operations. To avoid repetition, details are not described herein.

According to another aspect of this application, an embodiment of this application further provides a computer-readable storage medium (for example, a memory). The computer-readable storage medium is a memory device of the electronic device 600, and is configured to store a program and data. For example, the computer-readable storage medium is the computer-readable storage medium 620. The computer-readable storage medium 620 herein may include a built-in storage medium of the electronic device 600, and certainly may include an extended storage medium supported by the electronic device 600. The computer-readable storage medium provides a storage space. The storage space has an operating system of the electronic device 600 stored therein. In addition, one or more computer instructions configured to be loaded and executed by the processor 610 are further stored in the storage space. The computer instructions may be one or more computer programs 621 (including program code).

According to another aspect of this application, an embodiment of this application further provides a computer program product or a computer program, including computer instructions, the computer instructions being stored in a computer-readable storage medium. For example, the computer program may be the computer program 621. In this case, the electronic device 600 may be a computer. The processor 610 reads the computer instructions from the computer-readable storage medium 620. The processor 610 executes the computer instructions, so that the computer performs the method provided in the above optional implementations. In other words, when embodiments are implemented by using software, all or some of the embodiments may be implemented in a form of a computer program product. The computer program product includes one or more computer instructions. When the computer instructions are loaded and executed in the computer, all or some of the processes of the embodiments of this application may be run, or all or some of the functions may be implemented. The computer may be a general-purpose computer, a dedicated computer, a computer network, or another programmable apparatus. The computer instructions may be stored in the computer-readable storage medium, or may be transmitted from a computer-readable storage medium to another computer-readable storage medium. For example, the computer instructions may be transmitted from a website, a computer, a server, or a data center to another website, computer, server, or data center in a wired manner (for example, through a coaxial cable, an optical fiber, or a digital subscriber line (DSL)) or a wireless manner (for example, in an infrared, radio, or microwave manner).

A person of ordinary skill in the art may be aware that, the units and the process operations of the examples described in combination with the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it is not considered that such implementation goes beyond the scope of this application.

Finally, the above descriptions are merely specific implementations of this application, and are not intended to limit the protection scope of this application. Any variation or replacement readily figured out by a person skilled in the art within the technical scope disclosed in this application falls within the protection scope of this application. Therefore, the protection scope of this application is subject to the protection scope of the claims.

What is claimed is:

1. A multi-channel data transmission method comprising:

dividing a plurality of data packets into a plurality of groups, the plurality of data packets including at least one input data packet, and the plurality of groups including a target group that includes the at least one input data packet;

determining a target channel pair for the target group, the target channel pair including a primary transmission channel and an auxiliary transmission channel that are established based on different networks, wherein the determining the target channel pair includes: obtaining a plurality of available transmission channels; dividing the plurality of available transmission channels into a plurality of channel pairs; and performing matching on the plurality of groups and the plurality of channel pairs based on a ratio between transmission rates of the plurality of channel pairs, to obtain the target channel pair, wherein the dividing the plurality of available transmission channels into the plurality of channel pairs includes: ranking the plurality of available transmission channels in descending order of transmission rates of the transmission channels or in ascending order of delays of the transmission channels, to obtain an arrangement sequence of the plurality of available transmission channels; determining at least one transmission channel located at front among the plurality of available transmission channels as at least one primary transmission channel according to the arrangement sequence based on a quantity of the plurality of available transmission channels or an average bandwidth of the plurality of available transmission channels; determining transmission channels among the plurality of available transmission channels other than the at least one primary transmission channel as a maximum auxiliary channel set; and during determining of an auxiliary transmission channel of each of the at least one primary transmission channel based on the arrangement sequence, using the maximum auxiliary channel set as an initial value of a remaining channel set, determining a frontmost transmission channel in the remaining channel set as an auxiliary transmission channel of a current primary transmission channel, and removing the frontmost transmission channel from the remaining channel set, until the auxiliary transmission channels of all of the primary transmission channels are obtained, to obtain the plurality of channel pairs;

performing error correction encoding on the at least one input data packet, to obtain at least one output data packet and at least one error correction packet; and transmitting the at least one output data packet using the primary transmission channel, and transmitting the at least one error correction packet using the auxiliary transmission channel.

2. The method according to claim 1, wherein performing error correction encoding on the at least one input data packet includes:

obtaining a transmission performance parameter of the target channel pair;

determining an encoding parameter for the target group and a transmission parameter for the target channel pair based on the transmission performance parameter, the encoding parameter including a puncturing rate and a redundancy associated with a code word, and the transmission parameter including a transmission rate;

determining a group length for the target channel pair based on an input length of the code word;

determining, based on the transmission rate and the group length, a quantity of input groups inputted into the target channel pair in a unit time; and performing puncturing on the at least one input data based on the puncturing rate to obtain the at least one output data packet, and performing forward error correction encoding on the at least one input data packet based on the redundancy to obtain the at least one error correction packet, in response to determining that the input groups include the target group based on the quantity of the input groups in the unit time, the at least one error correction packet including the encoding parameter.

3. The method according to claim 2, wherein determining the encoding parameter for the target group and the transmission parameter for the target channel pair includes:

adjusting an encoding parameter for a previous group and a transmission parameter for the previous group based on the transmission performance parameter, to obtain the encoding parameter for the target group and the transmission parameter for the target channel pair, the previous group being transmitted using the target channel pair before the target group is transmitted.

4. The method according to claim 3, wherein:

the transmission performance parameter includes a packet loss rate of the target channel pair, a packet loss rate of the primary transmission channel, and a packet loss rate of the auxiliary transmission channel; and adjusting the encoding parameter for the previous group and the transmission parameter for the previous group includes:

in response to the packet loss rate of the target channel pair being equal to 0 and the packet loss rate of the primary transmission channel being equal to 0, reducing the redundancy and the puncturing rate for the target group and increasing the transmission rate for the target channel pair;

in response to the packet loss rate of the target channel pair being equal to 0 and the packet loss rate of the primary transmission channel being greater than 0:

reducing the redundancy for the target group in response to the packet loss rate of the primary transmission channel not exceeding a threshold; and increasing the puncturing rate for the target group in response to the packet loss rate of the primary transmission channel exceeding the threshold;

in response to the packet loss rate of the target channel pair being greater than 0 and the packet loss rate of the primary transmission channel being equal to 0, reducing the puncturing rate for the target group; and in response to the packet loss rate of the target channel pair being greater than 0 and the packet loss rate of the primary transmission channel being greater than 0:

increasing the redundancy for the target group in response to the packet loss rate of the auxiliary transmission channel being equal to 0 and the packet loss rate of the primary transmission channel not exceeding the threshold;

increasing the puncturing rate for the target group in response to the packet loss rate of the auxiliary transmission channel being equal to 0 and the packet loss rate of the primary transmission channel exceeding the threshold; and reducing the transmission rate for the target channel pair in response to the packet loss rate of the auxiliary transmission channel being greater than 0.

5. The method according to claim 2, wherein determining the encoding parameter for the target group and the transmission parameter for the target channel pair based on the transmission performance parameter includes:

determining an encoding parameter corresponding to the transmission performance parameter as the encoding parameter for the target group, and determining a transmission parameter corresponding to the transmission performance parameter as the transmission parameter for the target channel pair.

6. The method according to claim 1, wherein obtaining the plurality of channel pairs includes:

resetting the remaining channel set to the maximum auxiliary channel set and further determining the auxiliary transmission channel of each primary transmission channel in the remaining channel set based on the arrangement sequence, in response to a quantity of transmission channels in the remaining channel set being 0 and a quantity of the at least one primary transmission channel being greater than a quantity of transmission channels in the maximum auxiliary channel set, until the auxiliary transmission channels of all of the primary transmission channels are obtained, to obtain the plurality of channel pairs.

7. The method according to claim 1, wherein obtaining the plurality of channel pairs includes:

further determining the auxiliary transmission channel of each primary transmission channel in the remaining channel set based on the arrangement sequence, in response to an auxiliary transmission channel of a last one of the at least one primary transmission channel being obtained and the quantity of the at least one primary transmission channel being less than the quantity of transmission channels in the maximum auxiliary channel set, until a quantity of transmission channels in the remaining channel set is 0, to obtain the plurality of channel pairs.

8. The method according to claim 1, further comprising:

receiving feedback information, the feedback information including an identifier of a group to which a lost data packet belongs and an identifier of the lost data packet in the group;

generating retransmission data packets of the lost data packet based on the feedback information, the retransmission data packets including at least one input retransmission data packet;

dividing the retransmission data packets into a plurality of retransmission groups including a target retransmission group that includes the at least one input retransmission data packet;

determining a retransmission channel pair for the target retransmission group;

performing error correction encoding on the at least one input retransmission data packet, to obtain at least one output retransmission data packet and at least one retransmission error correction packet; and transmitting the at least one output retransmission data packet using a primary transmission channel of the retransmission channel pair, and transmitting the at least one retransmission error correction packet using an auxiliary transmission channel of the retransmission channel pair.

9. A non-transitory computer-readable storage medium, configured to store a computer program, the computer program causing a computer to perform the method according to claim 1.

10. A multi-channel data receiving method comprising:

determining a target channel pair, the target channel pair including a primary transmission channel and an auxiliary transmission channel that are established based on different networks, wherein determining the target channel pair includes: obtaining a plurality of available transmission channels; dividing the plurality of available transmission channels into a plurality of channel pairs; and performing matching on a plurality of groups including a target group that includes at least one output data packet and at least one error correction packet and the plurality of channel pairs based on a ratio between transmission rates of the plurality of channel pairs, to obtain the target channel pair, wherein dividing the plurality of available transmission channels into the plurality of channel pairs includes: ranking the plurality of available transmission channels in descending order of transmission rates of the transmission channels or in ascending order of delays of the transmission channels, to obtain an arrangement sequence of the plurality of available transmission channels; determining at least one transmission channel located at front among the plurality of available transmission channels as at least one primary transmission channel according to the arrangement sequence based on a quantity of the plurality of available transmission channels or an average bandwidth of the plurality of available transmission channels; determining transmission channels among the plurality of available transmission channels other than the at least one primary transmission channel as a maximum auxiliary channel set; and during determining of an auxiliary transmission channel of each of the at least one primary transmission channel based on the arrangement sequence, using the maximum auxiliary channel set as an initial value of a remaining channel set, determining a frontmost transmission channel in the remaining channel set as an auxiliary transmission channel of a current primary transmission channel, and removing the frontmost transmission channel from the remaining channel set, until the auxiliary transmission channels of all of the primary transmission channels are obtained, to obtain the plurality of channel pairs;

receiving the at least one output data packet using the primary transmission channel of the target channel pair, and receiving the at least one error correction packet using the auxiliary transmission channel of the target channel pair; and performing error correction decoding on the at least one output data packet based on the at least one error correction packet, to obtain a decoded data packet.

11. An electronic device comprising:

at least one processor; and at least one computer-readable storage medium storing at least one computer program that, when executed by the at least one processor, causes the electronic device to implement the method according to claim 10.

12. A non-transitory computer-readable storage medium storing at least one computer program that, when executed by at least one processor, causing an electronic device including the at least one processor to perform the method according to claim 10.

13. An electronic device comprising:

at least one processor; and at least one computer-readable storage medium storing at least one computer program that, when executed by the at least one processor, causes the electronic device to:

divide a plurality of data packets into a plurality of groups, the plurality of data packets including at least one input data packet, and the plurality of groups including a target group that includes the at least one input data packet;

determine a target channel pair for the target group, the target channel pair including a primary transmission channel and an auxiliary transmission channel that are established based on different networks, wherein the determining the target channel pair includes: obtaining a plurality of available transmission channels; dividing the plurality of available transmission channels into a plurality of channel pairs; and performing matching on the plurality of groups and the plurality of channel pairs based on a ratio between transmission rates of the plurality of channel pairs, to obtain the target channel pair, wherein the dividing the plurality of available transmission channels into the plurality of channel pairs includes: ranking the plurality of available transmission channels in descending order of transmission rates of the transmission channels or in ascending order of delays of the transmission channels, to obtain an arrangement sequence of the plurality of available transmission channels; determining at least one transmission channel located at front among the plurality of available transmission channels as at least one primary transmission channel according to the arrangement sequence based on a quantity of the plurality of available transmission channels or an average bandwidth of the plurality of available transmission channels; determining transmission channels among the plurality of available transmission channels other than the at least one primary transmission channel as a maximum auxiliary channel set; and during determining of an auxiliary transmission channel of each of the at least one primary transmission channel based on the arrangement sequence, using the maximum auxiliary channel set as an initial value of a remaining channel set, determining a frontmost transmission channel in the remaining channel set as an auxiliary transmission channel of a current primary transmission channel, and removing the frontmost transmission channel from the remaining channel set, until the auxiliary transmission channels of all of the primary transmission channels are obtained, to obtain the plurality of channel pairs;

perform error correction encoding on the at least one input data packet, to obtain at least one output data packet and at least one error correction packet; and transmit the at least one output data packet using the primary transmission channel, and transmitting the at least one error correction packet using the auxiliary transmission channel.

14. The electronic device according to claim 13, wherein the at least one computer program, when executed by the at least one processor, further causes the electronic device to, when performing error correction encoding on the at least one input data packet:

obtain a transmission performance parameter of the target channel pair;

determine an encoding parameter for the target group and a transmission parameter for the target channel pair based on the transmission performance parameter, the encoding parameter including a puncturing rate and a redundancy associated with a code word, and the transmission parameter including a transmission rate;

determine a group length for the target channel pair based on an input length of the code word;

determine, based on the transmission rate and the group length, a quantity of input groups inputted into the target channel pair in a unit time; and perform puncturing on the at least one input data based on the puncturing rate to obtain the at least one output data packet, and performing forward error correction encoding on the at least one input data packet based on the redundancy to obtain the at least one error correction packet, in response to determining that the input groups include the target group based on the quantity of the input groups in the unit time, the at least one error correction packet including the encoding parameter.

15. The electronic device according to claim 14, wherein the at least one computer program, when executed by the at least one processor, further causes the electronic device to, when determining the encoding parameter for the target group and the transmission parameter for the target channel pair:

adjust an encoding parameter for a previous group and a transmission parameter for the previous group based on the transmission performance parameter, to obtain the encoding parameter for the target group and the transmission parameter for the target channel pair, the previous group being transmitted using the target channel pair before the target group is transmitted.

16. The electronic device according to claim 15, wherein:

the transmission performance parameter includes a packet loss rate of the target channel pair, a packet loss rate of the primary transmission channel, and a packet loss rate of the auxiliary transmission channel; and the at least one computer program, when executed by the at least one processor, further causes the electronic device to, when adjusting the encoding parameter for the previous group and the transmission parameter for the previous group:

in response to the packet loss rate of the target channel pair being equal to 0 and the packet loss rate of the primary transmission channel being equal to 0, reduce the redundancy and the puncturing rate for the target group and increasing the transmission rate for the target channel pair;

in response to the packet loss rate of the target channel pair being equal to 0 and the packet loss rate of the primary transmission channel being greater than 0:

reduce the redundancy for the target group in response to the packet loss rate of the primary transmission channel not exceeding a threshold; and increase the puncturing rate for the target group in response to the packet loss rate of the primary transmission channel exceeding the threshold;

in response to the packet loss rate of the target channel pair being greater than 0 and the packet loss rate of the primary transmission channel being equal to 0, reduce the puncturing rate for the target group; and in response to the packet loss rate of the target channel pair being greater than 0 and the packet loss rate of the primary transmission channel being greater than 0:

increase the redundancy for the target group in response to the packet loss rate of the auxiliary transmission channel being equal to 0 and the packet loss rate of the primary transmission channel not exceeding the threshold;

increase the puncturing rate for the target group in response to the packet loss rate of the auxiliary transmission channel being equal to 0 and the packet loss rate of the primary transmission channel exceeding the threshold; and reduce the transmission rate for the target channel pair in response to the packet loss rate of the auxiliary transmission channel being greater than 0.

17. The electronic device according to claim 14, wherein the at least one computer program, when executed by the at least one processor, further causes the electronic device to, when determining the encoding parameter for the target group and the transmission parameter for the target channel pair based on the transmission performance parameter:

determine an encoding parameter corresponding to the transmission performance parameter as the encoding parameter for the target group, and determine a transmission parameter corresponding to the transmission performance parameter as the transmission parameter for the target channel pair.

* * * * *